Figure 1:
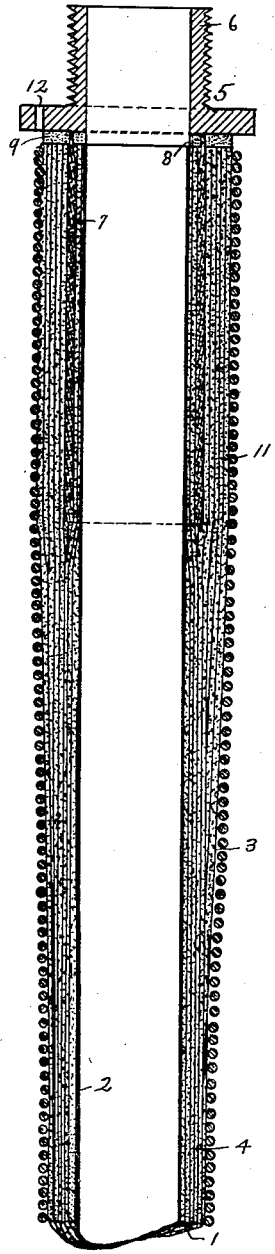

C. E. GIRTEN & A. M. BOWMAN.
HOSE ATTACHMENT.
APPLICATION FILED APR. 14, 1914.

1,205,987.

Patented Nov. 28, 1916.

UNITED STATES PATENT OFFICE.

CHARLES E. GIRTEN AND ARCHIBALD M. BOWMAN, OF HOUSTON, TEXAS.

HOSE ATTACHMENT.

1,205,987.   Specification of Letters Patent.   Patented Nov. 28, 1916.

Application filed April 14, 1914. Serial No. 831,750.

*To all whom it may concern:*

Be it known that we, CHARLES E. GIRTEN and ARCHIBALD M. BOWMAN, citizens of the United States, residing at Houston, in the county of Harris and State of Texas, have invented certain new and useful Improvements in Hose Attachments, of which the following is a specification.

This invention relates to new and useful improvements in hose attachments and has particular relation to a device for attaching or connecting flexible hose.

The device has been specially designed for use in hose which are used in well drilling for connecting the pump or stand pipe to the swivel in drilling oil or water wells by rotary drilling, but may be used in any connection where it may be found adaptable. At present the nipple which is connected to the stand pipe or swivel is also connected to the hose end by forcing the neck of said nipple into the hollow end of the hose and inasmuch as the hose, as at present constructed, is comparatively inelastic the nipple neck must be made small enough to enter the hose readily and the water passageway through said neck is, therefore, of smaller diameter than the water passageway through the hose and the nipple thus forms an obstruction, or restriction, to the fluid passing through the hose. Furthermore, no reinforcement is provided for the hose around the nipple neck and adjacent the inner end thereof, and as the swivel is moved up and down, as is necessary in rotary drilling, the inner end of the neck gradually cuts and wears the hose and causes said hose to break off at the end of said neck.

It is the object of this invention to provide a nipple which will be inserted between the fabric layers of the hose end so that the fluid passageway through the hose will not be restricted thereby, and the device also comprehends a reinforcement for the end of the hose adjacent the neck of the nipple to the end that said hose will be strengthened and will not readily wear or break in use, as in the case of the hose now in most general use.

A further feature of the invention resides in the provision of a nipple having a neck which will engage with the fabric layers of the hose so as to prevent said nipple from being pulled out of the hose end.

A still further feature of the invention resides in the provision of a spirally wound covering for the hose, forming a protector and reinforcement therefor, the free end of said spirally wound covering engaging with the nipple so as to prevent the same from unwinding and to assist in holding said nipple in position.

With the above and other objects in view, the invention has particular relation to certain novel features of construction, operation and arrangement of parts, an example of which is given in this specification and illustrated in the accompanying drawing, wherein—

Figure 2:
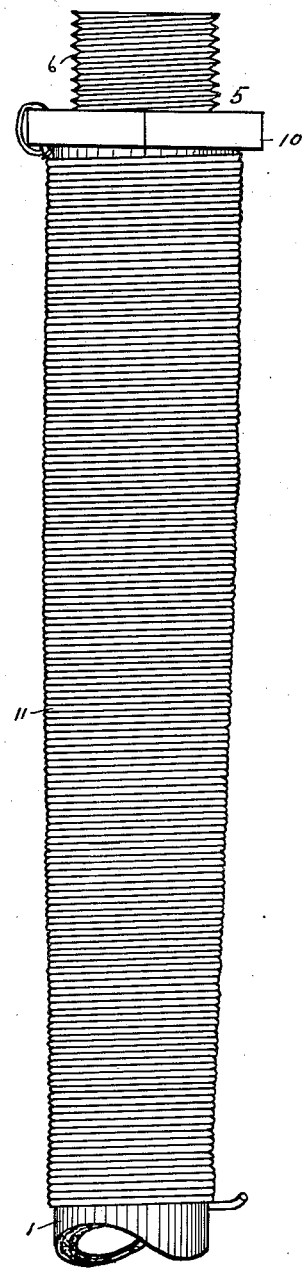

Figure 1 is a sectional side elevation of the attachment, and Fig. 2 is a side elevation thereof.

Referring now more particularly to the drawings, wherein like numerals of reference designate similar parts in each of the figures, the numeral 1 refers to the hose which is of the ordinary construction, having an inner lining 2 of rubber and also having a thin coating 3 of rubber on the outside, the hose proper being formed of fabric layers 4 interposed between said rubber lining and covering.

The numeral 5 refers to the nipple, as a whole. This nipple is a tubular metallic member having its outer end 6 exteriorly threaded so as to be screwed into the standpipe, swivel or other connection, and the neck 7 of the nipple is inserted between the layers of fabric forming the hose end. In the preferred form of construction there will be about three layers of fabric on the inside of the neck and five layers of fabric surrounding said neck, and the extreme end of the hose will be capped over, both within and on the outside of the neck, by means of rubber caps, numbered, respectively, 8 and 9. The end of the hose is reinforced by additional layers of fabric, arranged on the outside of the neck and which extends from the free end of the hose some distance back beyond the inner end of the neck 7. The end of the hose will thus have more layers of fabric than the body thereof and the hose will accordingly be somewhat enlarged at its end, but the fluid passageway therethrough will be uniform and not restricted by the nipple.

As is obvious from an inspection of Fig. 1, the neck of the nipple, in cross section, is serrated, both on its outside and inside. This cross sectional appearance is due to the fact that said nipple neck is formed, having annular beads, or teeth, the beads on the outside having an inclination toward the free end of the hose and those on the inside having a reverse inclination. These beads, or teeth, engage with the adjacent fabric layers and the nipple is by them held against the withdrawal or detachment of the nipple from the hose. The fabric layers are rubberized and are secured together by thin layers of rubber between them which adhere to the layers and hold them compactly together in the well known manner.

The nipple is provided with an enlarged intermediate polygonal section 10, which is integral therewith and which is provided so that a wrench may be readily engaged thereon when it is desired to screw the nipple into, or unscrew it from the apparatus to which it is to be connected. This section 10 abuts closely against the hose end.

A spirally wound covering 11 is provided for the hose, or at least for the end thereof. This covering is provided to protect and reinforce the hose and is usually formed of wire spirally wound so that its turns will lie close together and the free end of this spiral covering is passed through the orifice 12 of the polygonal section 10 and secured therein as shown in Fig. 2. The spiral covering is thus secured against unwinding and also serves the minor purpose of assisting to hold the nipple in place.

What we claim is:—

An attachment of the character described including the combination with a tubular hose formed of fabric layers, of a rubber cap secured to and protecting the free end of the hose, a tubular nipple having its outer end threaded and its inner end formed of an elongated neck, which is inserted between the layers of fabric, forming the hose ends, said neck being circumferentially corrugated from end to end, forming annular beads, both on the outside and inside, which are serrated in cross section, said beads engaging with the adjacent layers of fabric on the outside and inside of the neck and preventing the disengagement of the nipple from the hose end and an intermediate annular shoulder integral with the nipple and resting against said rubber cap.

In testimony whereof we have signed our names to this specification in the presence of two subscribing witnesses.

CHARLES E. GIRTEN.
ARCHIBALD M. BOWMAN.

Witnesses:
MAY MONTGOMERY,
FLORENCE GREENOUGH.